US009536010B2

United States Patent
Daouk et al.

(10) Patent No.: US 9,536,010 B2
(45) Date of Patent: Jan. 3, 2017

(54) AUTOMATED TICKETING

(71) Applicant: Amadeus S.A.S., Sophia Antipolis (FR)

(72) Inventors: Carine Daouk, London (GB);
Christelle Pardini, Antibes (FR);
Faustine Avramidis, Cagnes sur Mer (FR); Romain Rossi, Nice (FR);
Manuel Tangorra, Antibes (FR)

(73) Assignee: AMADEUS S.A.S., Biot (FR)

( * ) Notice: Subject to any disclaimer, the term of this patent is extended or adjusted under 35 U.S.C. 154(b) by 211 days.

(21) Appl. No.: 14/456,366

(22) Filed: Aug. 11, 2014

(65) Prior Publication Data
US 2016/0041840 A1    Feb. 11, 2016

(51) Int. Cl.
*G06F 9/44*       (2006.01)
*G06F 17/30*      (2006.01)
*G06Q 10/00*      (2012.01)
*G06Q 50/14*      (2012.01)

(52) U.S. Cl.
CPC ......... *G06F 17/30876* (2013.01); *G06Q 10/00* (2013.01); *G06Q 50/14* (2013.01)

(58) Field of Classification Search
CPC .. G06Q 30/06; G06Q 20/3674; G06Q 20/401; G06Q 10/02; G06Q 30/02; G06F 19/322; G06F 17/30011
See application file for complete search history.

(56) References Cited

U.S. PATENT DOCUMENTS

| | | | | |
|---|---|---|---|---|
| 5,410,722 A * | 4/1995 | Cornaby | .................... | G06F 5/06 718/102 |
| 7,155,716 B2 * | 12/2006 | Hooman | ............... | G06F 9/4881 711/100 |
| 2004/0216098 A1 * | 10/2004 | Roe | ........................ | G06F 9/4887 717/161 |
| 2005/0114858 A1 * | 5/2005 | Miller | .................... | G06F 9/485 718/100 |
| 2008/0244584 A1 * | 10/2008 | Smith | .................... | G06Q 10/06 718/102 |

(Continued)

OTHER PUBLICATIONS

Ko Fujimura et al.; General-purpose Digital Ticket Framework; 1998 USENIX; 23 pages; <https://www.usenix.org/legacy/event/ec98/full_papers/fujimura/fujimura_html/fujimura.html>.*

(Continued)

*Primary Examiner* — Thuy Dao
*Assistant Examiner* — Cuong V Luu
(74) *Attorney, Agent, or Firm* — Thompson Hine LLP (57) ABSTRACT

Methods, systems, and computer program products for automatically issuing travel documents. Tasks relating to issuance of travel documents are generated by an originating application in response to booking a travel service. The tasks are received and stored in a first queue until a triggering event, such as the arrival of a time for issuance of a document. In response to the triggering event, a task in the first queue may be placed in a second queue for transmission to an issuing application. The documents to be issued may be determined based on records in a passenger name record (PNR) stored in a database. The PNR may be determined based on the task. The PNR may be updated with information indicating whether task processing was successful. In the event of an error, information indicating the cause of the error may be added to the PNR.

20 Claims, 7 Drawing Sheets

(56) References Cited

U.S. PATENT DOCUMENTS

| | | | | |
|---|---|---|---|---|
| 2014/0137128 A1* | 5/2014 | Chang | .................. | G06F 9/4881 |
| | | | | 718/103 |
| 2015/0244775 A1* | 8/2015 | Vibhor | .................. | G06Q 10/06 |
| | | | | 709/203 |
| 2015/0269433 A1* | 9/2015 | Amtrup | .............. | G06Q 20/3276 |
| | | | | 382/115 |

OTHER PUBLICATIONS

Vijayan Sugumaran et al.; Ontologies for conceptual modeling: their creation, use, and management; 2002 Elsevier; pp. 251-271; <http://www.sciencedirect.com/science/article/pii/S0169023X02000484>.*

Chang-Joo Moon et al.; A User Authentication Model for the OSGi Service Platform; 2005 Springer; pp. 495-504; <http://link.springer.com/chapter/10.1007%2F978-3-540-30585-9_55#page-1>.*

William F. Caul et al.; Schedule-dependent effects of haloperidol and amphetamine multiple-schedule task shows within-subject effects; 2001 Elsevier; pp. 53-63; <http://www.sciencedirect.com/science/article/pii/S0091305700004317>.*

Thierry Gautier et al.; KAAPI A thread scheduling runtime system for data flow computations on cluster of multi-processors; 2007 ACM; pp. 15-23; <http://dl.acm.org/citation.cfm?id=1278182>.*

Chun Wong et al.; Task concurrency management methodology to schedule the MPEG4 IM1 player on a highly parallel processor platform; 2001 ACM; pp. 170-175; <http://dl.acm.org/citation.cfm?id=371712>.*

\* cited by examiner

AUTOMATED TICKETING

BACKGROUND

The invention generally relates to computers and computer systems and, in particular, to methods, systems, and computer program products for automated issuance of travel-related documents.

Travelers who purchase travel services are typically issued travel documents prior to receiving travel services. Travel documents, such as electronic or paper tickets, are then redeemed by the traveler to obtain the purchased services. Travel documents thereby provide a way for the travel service provider to determine that the traveler is entitled to receive the service. Travel documents may be generated based on the content of a Passenger Name Record (PNR). PNRs are typically stored in a computerized reservation system, and define an itinerary for a traveler or a group of travelers travelling together. PNRs are typically generated or modified each time a travel service is booked for or added to a trip. A PNR may be accessed by computer systems, such as ticketing and reservation computer systems, to obtain information regarding the travelers or services that are to be provided for the trip, or to update the PNR. Travel service providers and travelers are linked by documents issued from the PNR to finalize the sale. In addition to providing proof of payment, issuing the documents may trigger a financial settlement between the service provider and the traveler.

To issue the documents to the traveler, a travel agent may access the ticketing system and request the documents be issued one at a time. The travel agent may also simultaneously issue multiple documents for a single PNR using burst ticketing. Burst ticketing causes travel documents to be issued for multiple services defined in the PNR. When multiple documents are simultaneously issued, the ability of the travel agent to select different dates or times for issuing each travel document, or having documents issue at different ticketing offices may be limited. Thus, if the travel agent wants travel documents to be issued on different days or at different ticketing offices, the travel agent will typically have to remember to manually trigger issuance at the selected time and place for each travel document. If the travel itinerary is spread across multiple PNRs, burst ticketing may require that each PNR be handled separately. Burst ticketing may also leave PNRs in the queue, until cleared by the travel agent, in cases where one or more travel documents cannot be issued for a service defined by the PNR.

Thus, improved systems, methods, and computer program products are needed for generating and issuing travel documents in the travel industry.

SUMMARY

In an embodiment of the invention, a method of issuing documents for travel products is provided. The method includes receiving data defining a plurality of tasks, each task relating to issuance of a document and having a time for issuance. Each task is queued in a first queue, and in response to a trigger condition for a task in the first queue being met, the task is forwarded from the first queue to a second queue.

In another embodiment of the invention, an apparatus for issuing documents for travel products is provided. The apparatus includes a processor and a memory coupled to the processor. The memory includes instructions that, when executed by the processor, cause the apparatus to receive the data defining the plurality of tasks, each task relating to issuance of a document and having a time for issuance. The instructions further cause the apparatus to queue each task in the first queue, and in response to the trigger condition for the task in the first queue being met, forward the task from the first queue to the second queue.

In another embodiment of the invention, a computer program product is provided that includes a non-transitory computer readable storage medium including instructions. The instructions may be configured, when executed by the processor, to cause the processor to receive the data defining the plurality of tasks, each task relating to issuance of a document and having a time for issuance. The instructions further cause the processor to queue each task in the first queue, and in response to the trigger condition for the task in the first queue being met, forward the task from the first queue to the second queue.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention.

DETAILED DESCRIPTION

Embodiments of the invention may be implemented by a computing system comprising one or more networked computers or servers. The computing system may include a Global Distribution System (GDS), and may provide processing and database functions for travel-related systems and modules that provide automated ticking. In an embodiment of the invention, automated ticketing may be implemented by a scheduler module and issuance module. The scheduler module may organize and schedule document issuing tasks for transmission to the issuance module. The issuance module may then cause the documents to be issued. The scheduler and issuance modules may thereby work cooperatively to issue travel-related documents automatically based on one or more tasks parsed from a Passenger Name Record (PNR). These documents may include paper tickets, electronic tickets, Electronic Miscellaneous Documents (EMDs), Miscellaneous Charge Orders (MCO), electronic ticket record receipts, EMD passenger receipts, itinerary receipts, insurance certificates, or any other travel-related document. The scheduling and issuance modules may be configured so that documents can be automatically issued at one or more designated ticketing offices and at desired times and dates.

The scheduler and issuance modules may have a parallel configuration that facilitates scaling of the automated ticketing system by allowing additional resources to be called upon as needed. The parallel configuration may also enable the automated system to interface with multiple external systems simultaneously without a negative impact on the global flow of task processing. This parallel configuration may further enable the scheduler and issuance modules to provide independent throttling of tasks issued to different external systems, thereby maintaining the integrity of external systems.

Figure 1:
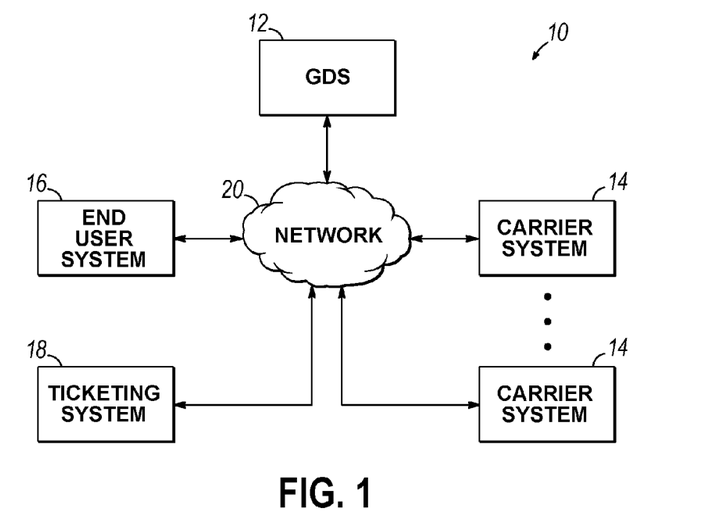
FIG. 1 is a diagrammatic view of an exemplary operating environment including a plurality of computing systems in communication via a network.

Referring now to FIG. 1, an operating environment 10 in accordance with an embodiment of the invention may include a Global Distribution System (GDS) 12, one or more travel service provider systems, such as carrier systems 14, one or more on-line travel agency or other indirect seller systems, such as end user system 16, and a ticketing system 18. Each of the GDS 12, carrier systems 14, end user system 16, and ticketing system 18, may communicate through a network 20. The network 20 may include one or more private or public networks (e.g., the Internet) that enable the exchange of data.

The GDS 12 may be configured to facilitate communication between the carrier systems 14 and end user system 16 by enabling end users (e.g., travel agents, agents for validating carriers, internet robots, or other indirect sellers) to search for available services and book reservations on one or more carrier systems 14 via the GDS 12. To this end, the GDS 12 may maintain links to each of the carrier systems 14 via the network 20. These links may allow the GDS 12 to obtain scheduling and availability data for services from the carrier systems 14. The end user system 16 may thereby book flights, trains, hotels, rental cars or other travel services from multiple service providers via a single connection to the GDS 12.

In response to a service being booked, the GDS 12 may receive and store a PNR for that service, or modify an existing PNR to reflect the addition of the booked service to the itinerary. The PNR may be generated, at least in part, by the carrier systems 14, and may comprise one or more reservation records that define one or more booked reservations. The PNR may also track usage of the purchased travel services by identifying the travel service as active (e.g., for a service yet to be provided by the corresponding service provider), passive (e.g., for a service reserved in another system or provided by a third party), past date, flown, information, open (e.g., for a purchased service having an open date), or canceled. The PNR may be stored in a database so that the PNR can be accessed by the GDS 12, carrier system 14, end user system 16, and ticketing system 18. The PNR may be identified by a record locator unique to that PNR, and may include records defining an itinerary for a particular trip, service, passenger, or group of passengers. The itinerary may include services from multiple carriers (e.g., flights, bus, or rail segments), hotel reservations, rental car reservations, or any other travel-related services.

The GDS 12, carrier systems 14, or ticketing system 18 may include one or more databases that store data relating to travel documents associated with a purchased travel service. This data may include one or more electronic coupons each corresponding to a service identified by a paper ticket, an electronic ticket, an Electronic Miscellaneous Document (EMD), or a Miscellaneous Charge Order (MCO). The database may also include records relating to electronic ticket record receipts, EMD passenger receipts, itinerary receipts, insurance certificates, or any other travel-related document. In response to one or more of the electronic coupons being used, exchanged, or refunded, the database may be updated to reflect a change in status of the electronic document.

The ticketing system 18 may be in communication with the end user system 16 via the network 20 or some other suitable connection. In alternative embodiments of the invention, all or a portion of the ticketing system 18 may be integrated into one or more of the other systems, such as the GDS 12. In any case, end users may use the end user system 16 to search for and book travel services, and the ticketing system 18 may issue and manage documents for the purchased services.

Figure 2:
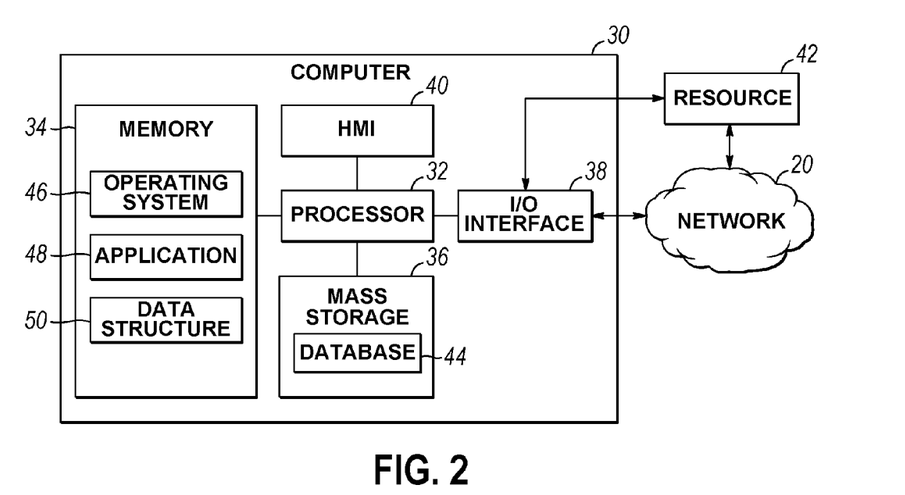
FIG. 2 is a diagrammatic view of an exemplary computing system of FIG. 1.

Referring now to FIG. 2, the GDS 12, carrier systems 14, end user system 16, ticketing system 18, and network 20 of operating environment 10 may be implemented on one or more computing devices or systems (collectively referred to herein as a computer), such as computer 30. The computer 30 may include at least one processor 32, a memory 34, a mass storage memory device 36, an input/output (I/O) interface 38, and a Human Machine Interface (HMI) 40. The computer 30 may also be operatively coupled to one or more external resources 42 via the network 20 or I/O interface 38. External resources may include, but are not limited to, servers, databases, mass storage devices, peripheral devices, cloud-based network services, or any other suitable computing resource that may be used by the computer 30.

The processor 32 may include one or more devices selected from microprocessors, micro-controllers, digital signal processors, microcomputers, central processing units, field programmable gate arrays, programmable logic devices, state machines, logic circuits, analog circuits, digital circuits, or any other device that manipulates signals (analog or digital) based on operational instructions that are stored in the memory 34. Memory 34 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or any other device capable of storing data. The mass storage memory device 36 may include data storage devices such as a hard drive, optical drive, tape drive, non-volatile solid state device, or any other device capable of storing data.

Processor 32 may operate under the control of an operating system 46 that resides in memory 34. The operating system 46 may manage computing resources so that computer program code embodied as one or more computer software applications, such as an application 48 residing in memory 34, may have instructions executed by the processor 32. In an alternative embodiment, the processor 32 may execute the application 48 directly, in which case the operating system 46 may be omitted. One or more data structures 50 may also reside in memory 34, and may be used by the processor 32, operating system 46, or application 48 to store or manipulate data.

The I/O interface 38 may provide a machine interface that operatively couples the processor 32 to other devices and systems, such as the network 20 or external resource 42. The application 48 may thereby work cooperatively with the network 20 or external resource 42 by communicating via the I/O interface 38 to provide the various features, functions, applications, processes, or modules comprising embodiments of the invention. The application 48 may also have program code that is executed by one or more external resources 42, or otherwise rely on functions or signals provided by other system or network components external to the computer 30. Indeed, given the nearly endless hardware and software configurations possible, persons having ordinary skill in the art will understand that embodiments of the invention may include applications and databases that are located externally to the computer 30, distributed among multiple computers or other external resources 42, or provided by computing resources (hardware and software) that are provided as a service over the network 20, such as a cloud computing service.

The HMI 40 may be operatively coupled to the processor 32 of computer 30 in a known manner to allow a user to interact directly with the computer 30. The HMI 40 may include video or alphanumeric displays, a touch screen, a speaker, and any other suitable audio and visual indicators capable of providing data to the user. The HMI 40 may also include input devices and controls such as an alphanumeric keyboard, a pointing device, keypads, pushbuttons, control knobs, microphones, etc., capable of accepting commands or input from the user and transmitting the entered input to the processor 32.

A database 44 may reside on the mass storage memory device 28, and may be used to collect and organize data used by the various systems and modules described herein. The database 44 may include data and supporting data structures that store and organize the data. In particular, the database 44 may be arranged with any database organization or structure including, but not limited to, a relational database, a hierarchical database, a network database, or combinations thereof. A database management system in the form of a computer software application executing as instructions on the processor 24 may be used to access the information or data stored in records of the database 44 in response to a query, where a query may be dynamically determined and executed by the operating system 46, other applications 48, or one or more modules.

Figure 3:
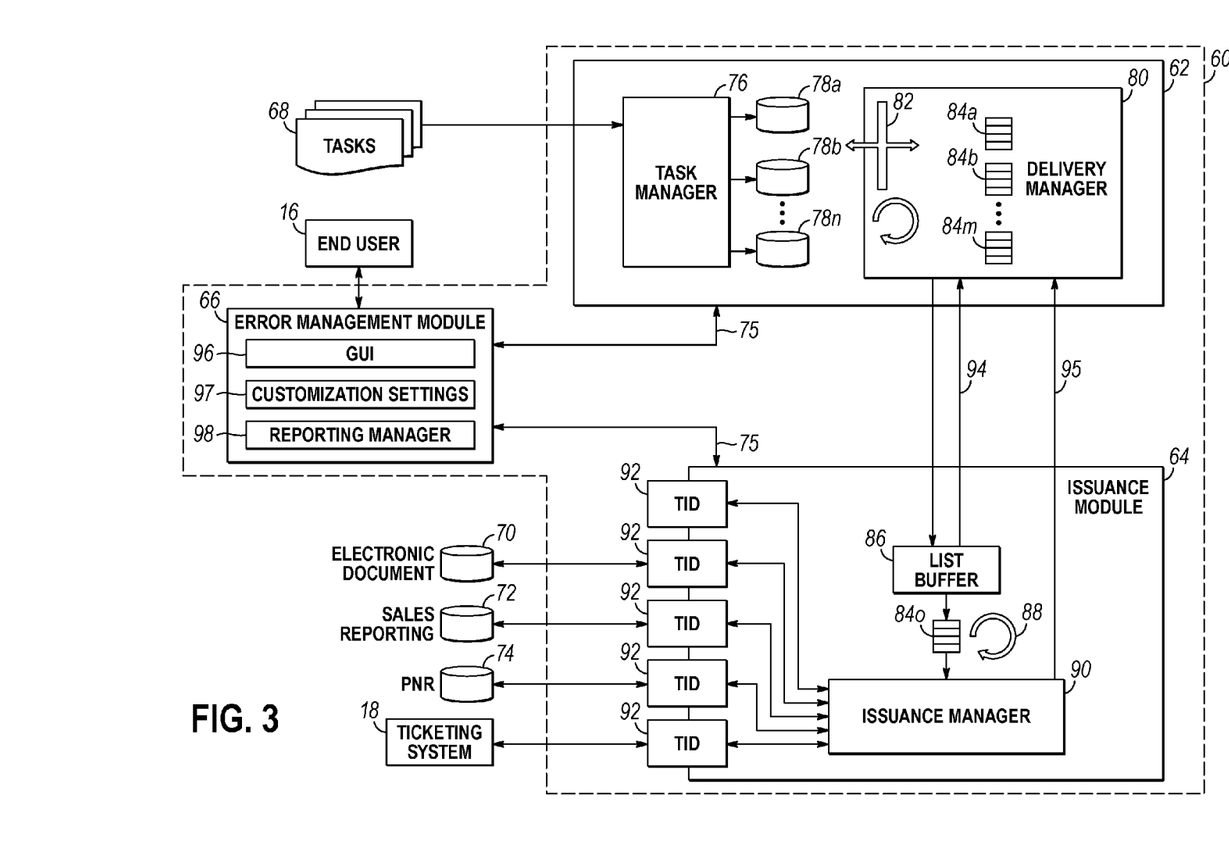
FIG. 3 is a schematic view of a task processing system including a scheduler module, an issuance module, and an error management module.

Referring now to FIG. 3, a task processing system 60 may include a scheduler module 62, an issuance module 64, and an error management module 66. The scheduler module 62 may be configured to receive tasks 68 from an originating application, which may operate on the GDS 12, end user system 16, or ticketing system 18. The scheduler module 62 may also be configured to handle multiple task types, including tasks 68 from other applications. Tasks 68 may include, for example, an automatic ticketing reliability related task, cancellation of a specific PNR element (e.g., task type="PNR element cancellation"), or any other suitable type of task. The tasks 68 may relate to issuance of a document, such as a paper ticket, electronic ticket, EMD, MCO, or any other suitable travel document. By way of example, the tasks 68 may be originated by the end user during booking of a travel service via the end user system 16. The end user may choose a date and time for issuance, the office of issuance, what comfort documents to be printed, and store this data as a record in the corresponding PNR. The end user may also print the associated comfort documents at the time of booking, or choose to have one or more documents issue manually.

The scheduler module 62 may work cooperatively with the issuance module 64 to issue documents and update databases by communicating with external systems, such as the ticketing system 18, an electronic document database 70, sales reporting database 72, and PNR database 74. The error management module 66 may receive status messages 75 from the scheduler module 62 and issuance module 64, and communicate corresponding status updates to the end user through the end user system 16.

The scheduler module 62 may include a task manager 76, a plurality of queues or databases 78a-78n, and a delivery manager 80. The task manager 76 may receive the tasks 68 and store each task 68 in one of the databases 78a-78n. The tasks 68 may be stored to the databases 78a-78n based on the type of task 68 so that different types of tasks 68 are isolated by type. To this end, the task manager 76 may identify the type of task 68 as the task 68 is received, and store the task 68 in a corresponding one of the databases 78a-78n.

The delivery manager 80 may include one or more scheduling daemons 82 that retrieve tasks from the databases 78a-78n and group the tasks 68 into queues or task lists 84a-84m for transmission to the issuance module 64. The scheduling daemons 82 may include a separate daemon 82 for each task type, and may query their respective databases 78a-78n at an individually selectable frequency. Tasks 68 that are ready to be processed may thereby be transmitted to the issuance module 64 at a rate (e.g., tasks-per-second) corresponding to an expected processing time for the type of task in question. To this end, the scheduling daemons 82 may include a throttling feature that adjusts the rate at which tasks are de-queued.

Each task list 84a-84m may comprise a plurality of tasks that are ready for processing. The number of tasks per list, as well as the configuration of the list, may be determined by the end user. Each list may, for example, include tasks corresponding to a specific PNR, a group of PNRs associated with a specific trip, one or more documents that are to be issued at a particular time or place, or a group of tasks scheduled for processing at about the same time. In an embodiment of the invention, the delivery manager 80 may queue the task list 84a-84m for transmission to the issuance module 64 in response to the task list 84a-84m being generated. Thus, the scheduling daemons 82 may determine when tasks 68 are transmitted to the issuance module 64 for processing.

The issuance module 64 may include a list buffer 86, a queuing daemon 88, an issuance manager 90, and a plurality of ticketing identifiers (TIDs) 92. The list buffer 86 may include a task queue configured to receive the task list, such as exemplary task list 84o. In response to all the tasks in the task list 84o being received and queued, the list buffer may transmit an acknowledgement 94 to the scheduler module 62. The received task list 84o may be de-queued in the scheduler module 62 in response to receiving the acknowledgement 94 from issuance module 64 indicating that the task list 84o has been successfully queued by the list buffer 86.

The queuing daemon 88 may manage the task queue by removing tasks 68 from the task queue, and transmitting requests to the issuance manager 90 to process the removed tasks 68. In response to receiving the request from the queuing daemon 88, the issuance manager 90 may select a ticketing identifier 92 from a plurality of ticketing identifiers 92. Each ticketing identifier 92 may be configured to communicate with one or more document issuing applications or databases. The document issuing applications may be provided by external systems, such as the ticketing system 18. The databases may include the electronic document database 70, the sales reporting database 72, or the PNR database 74. The document issuing applications may generate documents corresponding to the tasks 68 and the databases updated accordingly to process the task 68. In response to the task 68 being processed, the issuance manager 90 may transmit a task status message 95 to the scheduler module 62 indicating that the task 68 has been processed. In the event that a task 68 cannot be processed, the task status message 95 may indicate this to the scheduler module 62 so that the task can be retransmitted to the issuance module 64.

The error management module 66 may include a Graphical User Interface (GUI) 96, customization settings 97, and a reporting manager 98. The scheduler module 62 and issuance module 64 may transmit the status messages 75 to the error management module 66 so that the error management module 66 can generate reporting files based on the status messages 75. The report generation may be run as a batch process during off hours. The end user may access these status reports via the GUI 96 to determine the status of the automated document issuance process. In an embodiment of the invention, the reports may be formatted as a web page and accessed though a web browser application.

The status reports may be customized, and may be sent to one or more predefined addresses. Issuance results may be stored in a database (not shown), and viewed by the end user via the GUI 96. The end user may thereby access statistics during a predefined period. These statistics may include successful issuances, failed issuances, percentages of failed and successful issuances, failure identity numbers for failed tasks, number of printed documents, ranking, most frequent errors, or any other suitable statistics. The GUI 96 may also allow the end user to determine possible workarounds for errors, access a maintenance record reference, determine the status of a current process, and access PNRs in the PNR database 74.

The reporting manager 98 may generate a reporting file base on the status reports, issuance results, and system statistics. The reporting file may be transmitted to the end user, at any time, in any format, and via different media, such as by e-mail or any other suitable communication medium. The GUI 96 may also enable the end user to customize the reporting file by adjusting the customization settings 97. Notifications may thereby be tailored to warn a defined end user of specific events. For example, the reporting manager 98 may be configured to send a page to a system technician in response to receiving a status message 75 indicating that there has been a massive issuance failure. As a further example, the reporting manager 98 may be configured to send an e-mail to the end user in response to receiving a status message 75 indicating that a task status has changed. The error management module 66 may also be configured to archive events detected and actions performed during the automated ticketing process for a defined period.

Figure 4:
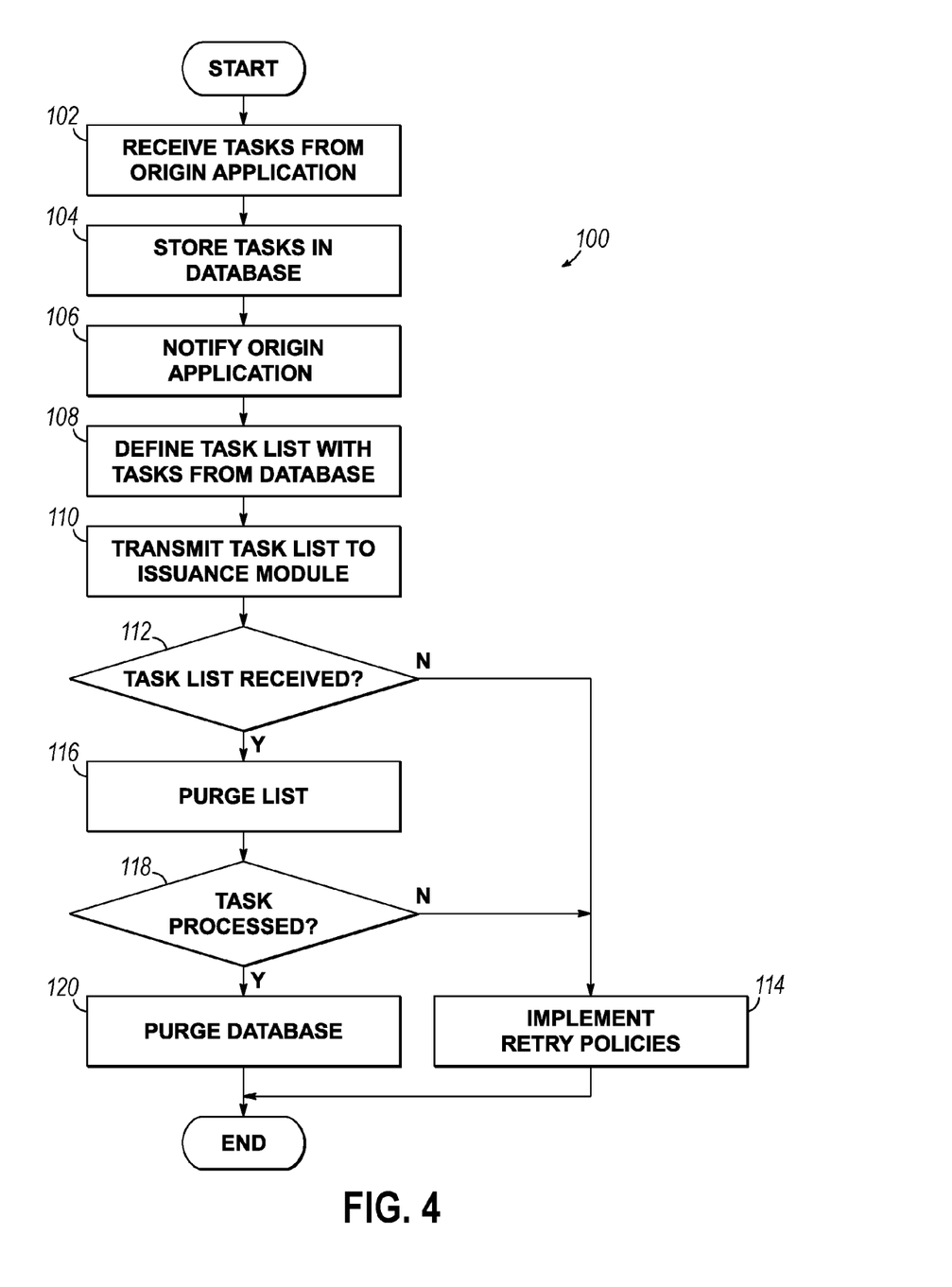
FIG. 4 is a flowchart of a scheduling process that may be performed by the task processing system of FIG. 3 to process tasks received from an origin application.

Referring now to FIG. 4, a flowchart depicts a scheduling process 100 that may be implemented by the scheduler module 62. In block 102, the scheduling process 100 receives the tasks 68 from an originating application. The originating application may be an application running on the GDS 12, one of the carrier systems 14, the end user system 16, the ticketing system 18, or any other suitable system. For example, the end user may generate or modify a PNR by quoting and booking a travel service, such as a flight, from the end user system 16. The end user may then add one or more records to the PNR indicating: (1) what documents are to be issued; (2) a date, time, and place for the documents to be issued; and (3) which comfort documents should be generated for the traveler. When the end user has finished booking the travel service, the end user may validate the transaction. In response to the end user validating the transaction, a parsing application may detect the PNR activity associated with the booking, and create a task 68 that is sent to the scheduler module 62. This task 68 may be named, for example, "automated ticketing" and transmitted to the scheduler module 62.

In response to receiving the tasks 68, the scheduling process 100 may proceed to block 104. In block 104, the scheduling process 100 may store each task 68 in the database 78*a*-78*n* corresponding to the type of task 68 being stored. To this end, the task manager 76 may be configured to determine the type of task 68 received. Types of tasks 68 may include, but are not limited to, automated ticketing, issuing a paper ticket, issuing an electronic ticket, issuing an EMD, issuing an MCO, issuing receipts, or any other suitable task.

In response to the tasks 68 being stored in the databases 78*a*-78*n*, the scheduling process 100 may proceed to block 106. In block 106, the scheduling process 100 may transmit an acknowledgement to the originating application that the tasks 68 have been received. The scheduling process 100 may then proceed to block 108.

In block 108, the scheduling process 100 may define the task lists 84*a*-84*m*. To this end, the scheduling daemons 82 may select tasks from the databases 78*a*-78*n* and add each task to one of the task lists 84*a*-84*m*. Tasks 68 may be selected based on the occurrence of an event, such as the arrival of a time or date for which processing of the task was requested. For example, the scheduling daemons 82 may look up and group a task 68 into a task list 84*a*-84*m* based on a time or date for issuance of a document. Tasks 68 may be grouped by the type of task 68 to improve scalability, based on the system receiving the task 68, and to improve system performance. Tasks 68 may also be grouped based on functional criteria, such as office ID, market, and PNR.

In response to the tasks 68 being grouped into the task lists 84*a*-84*m*, the process may proceed to block 110. In block 110, the task lists 84*a*-84*m* may be transmitted to the issuance module 64. Hash validation may be used to validate tasks 68 and task lists 84*a*-84*m* transmitted from the scheduler module 62 to the issuance module 64. The scheduling process 100 may then proceed to block 112 and determine if the task list was received by the issuance module 64. This determination may be made, for example, in response to receiving the acknowledgement 94 from the issuance module 64.

In response to determining the task list 84*a*-84*m* was not received ("NO" branch of decision block 112), the scheduling process 100 may proceed to block 114 and implement retry policies for the failed transmission. These retry policies may be customizable by the end user, and may include selectable parameters such as: (1) an initial delay before the next retry attempt; (2) an amount of delay increase between retry attempts; (3) a maximum allowable retry attempts; (4) a maximum allowable delay; and (5) a time-out parameter.

In response to a determination that the task list 84*a*-84*m* was received by the issuance module 64 ("YES" branch of decision block 112), the scheduling process 100 may proceed to block 116. In block 116, the scheduling process 100 may purge the received task list 84*a*-84*m* from the delivery manager 80. In an embodiment of the invention, the task lists 84*a*-84*m* may each comprise an array of pointers, with each pointer serving as an index to a task 68 stored in one of the databases 78*a*-78*n*.

In block 118, the scheduling process 100 may determine if one of the tasks 68 in one of the task lists 84*a*-84*m* transmitted to the issuance module 64 was processed. This determination may be made based on the task status message 95 received from the issuance module 64. In response to a determination that the task was not processed ("NO" branch of decision block 118), the process may proceed to block 114 and implement retry policies for a failed task. The retry policies for the failed task may include end user selectable parameters similarly as described above with respect to a failed transmission of the task list 84a-84m. That is, the retry parameters may include: (1) an initial delay parameter; (2) an amount of delay increase between retry attempts parameter; (3) a maximum allowable retry attempts parameter; (4) a maximum allowable delay parameter; and (5) a time-out parameter.

If the scheduling process 100 determines that the task 68 has been processed ("YES" branch of decision block 118), the scheduling process 100 may proceed to block 120 and purge the task 68 from the corresponding database 78a-78n. Because embodiments of the invention wait until processing of received tasks 68 is confirmed before purging the task 68 from the databases 78n-78m, transmission of the scheduled tasks 68 may be guaranteed.

Embodiments of the invention may include a plurality of retry policies implemented by the scheduler module 62. These retry policies may be applied at a transmission level and at a processing level. In addition, each task type may have a corresponding set of retry configuration parameters that define the retry cycle for tasks of that type. A complete retry cycle may be composed of one or more attempts, or "loops", depending on the parameter settings for that task.

Figure 5:
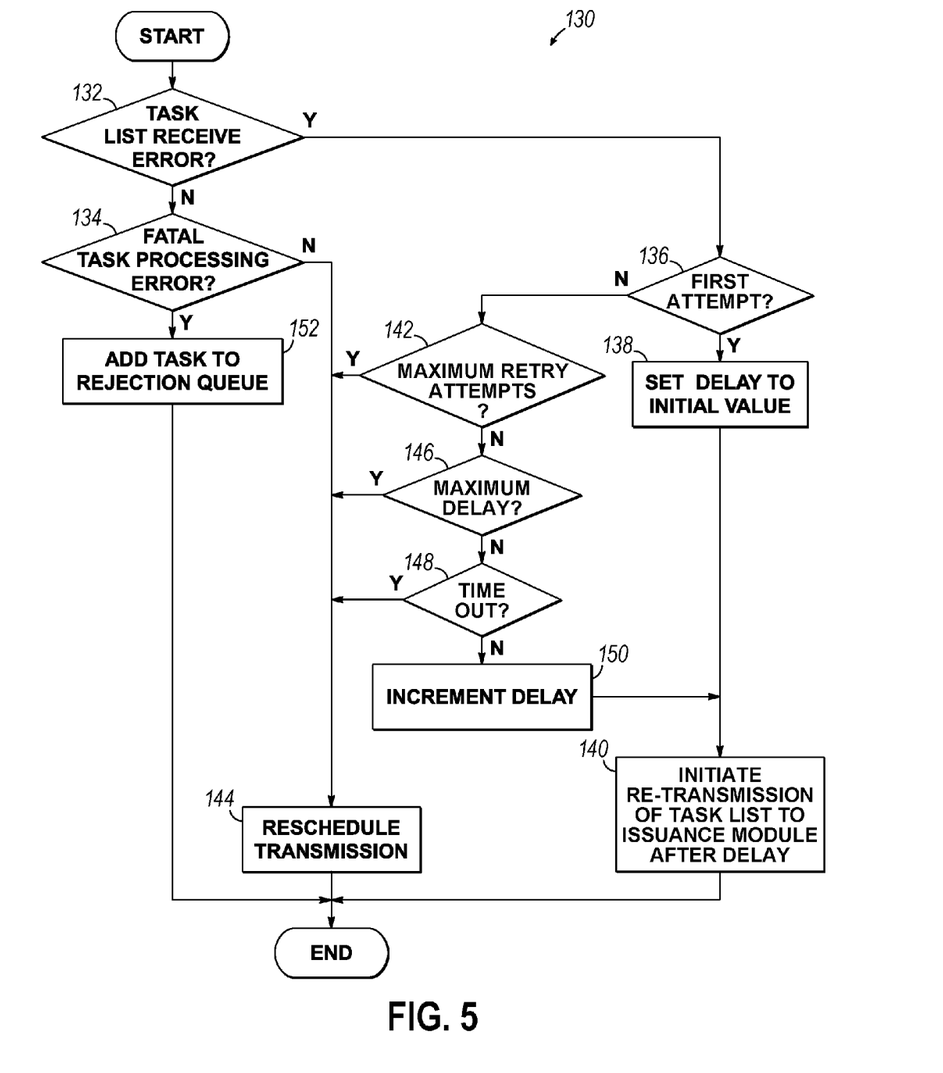
FIG. 5 is a flowchart of a retry process that may be performed by the task processing system of FIG. 3 for processing tasks which had processing errors on a previous attempt.

Referring now to FIG. 5, a flow chart depicts a retry process 130 that may be performed by the scheduler module 62 to implement the retry policies in block 114 of scheduling process 100. In block 132, the retry process 130 may determine if the error is due to a failure in transmission of one of the task lists 84a-84m, or a failure to process the task 68. In response to determining the error is not a task list receive error ("NO" branch of decision block 132), the retry process 130 may proceed to block 134. This may occur, for example, if the scheduling process 100 entered block 114 due to a task processing failure (e.g., from block 118 in FIG. 4).

If the error is a task list receive error ("YES" branch of decision block 132), the retry process 130 may proceed to block 136. In block 136, the retry process 130 may determine if the current failure is the first transmission failure for the task list 84a-84m in question. In response to determining that the current failure is the first transmission failure for the task list 84a-84m ("YES" branch of decision block 136), the retry process 130 may proceed to block 138 and set a retry delay to the initial delay value before proceeding to block 140. In response to determining the current failure is not the first transmission failure ("NO" branch of decision block 136), the retry process 130 may proceed to block 142.

In block 142, the retry process 130 may determine how many times the scheduler module 62 has tried to transmit the task list 84a-84m to the issuance module 64. In response to determining the number of attempted transmissions exceeds the maximum number of retry attempts ("YES" branch of decision block 142), the retry process 130 may proceed to block 144 and reschedule transmission of the task list 84a-84m. Rescheduling may comprise, for example, causing the scheduling daemons 82 of scheduler module 62 to add the tasks in the failed task list from the databases 78a-78n to one or more new task lists 84a-84m. That is, the scheduler module 62 may restart the process of transmitting the tasks 68 to the issuance module 64.

If the number of attempted transmissions does not exceed the maximum allowable number of retry attempts ("NO" branch of decision block 142), the retry process 130 may proceed to block 146. In block 146, the retry process 130 may determine if the current delay between retry attempts exceeds the maximum allowable delay. In response to determining the delay exceeds the maximum allowable delay ("YES" branch of decision block 144), the retry process 130 may proceed to block 144 and reschedule the tasks as described above. In response to determining the delay does not exceed the maximum delay ("NO" branch of decision block 146), the retry process 130 may proceed to block 148.

In block 148, the retry process 130 may determine if transmission of the task list 84a-84m has timed out. That is, has more than a maximum allowable amount of time passed since the first attempt to transmit the task list 84a-84m to the issuance module 64. In response to determining the transmission process has timed out ("YES" branch of decision block 148), the retry process 130 may proceed to block 144 and reschedule the tasks as described above. In response to determining the transmission process has not timed out ("NO" branch of decision block 148), the retry process 130 may proceed to block 150 and increment the delay before proceeding to block 140. The delay may be incremented by a predetermined amount, an amount determined based on how many retry attempts have been made, the type of tasks in the task list, or any other suitable parameter. In block 140, the retry process 130 may reattempt transmission of the task list 84a-84m to the issuance module 64 by re-queuing the task list 84a-84m with the delay for retransmission.

In an alternative embodiment of the invention, the retry process 130 may include or omit any of the retry attempt, maximum delay, or time out parameters in determining whether to reattempt transmission of the task list 84a-84m. In addition, embodiments of the invention may allow the end user to select which parameters are used to define the retry process 130. These parameters may also be set to different values depending on the types of tasks 68 comprising the task list 84a-84m being transmitted. In any case, guaranteed transmission may be optional, and may guarantee transmission of task lists 84a-84m following an-all-or-nothing policy. That is, either all tasks 68 from the task list 84a-84m are received, or transmission of the task list 84a-84m is considered failed.

Returning now to block 134, a processing error may indicate a failure to process a particular task 68 from the task list 84a-84m. In response to determining the processing error is not fatal ("NO" branch of decision block 134), the retry process 130 may proceed to block 144 and reschedule the task 68 for processing. In response to determining the processing error is fatal ("YES" branch of decision block 134), the retry process 130 may proceed to block 152. The processing error may be fatal, for example, if one of the scheduler module 62, issuance module 64, or error management module 66 determines that the task 68 cannot be processed. The processing error may also be considered fatal, for example, due to: (1) the number of reschedule attempts for the task in question exceeding a maximum allowable number of reschedule attempts; (2) a delay until the next rescheduling attempt exceeding a maximum allowable delay; or (3) a time-out parameter being exceeded. That is, the retry process 130 may apply a similar set of criteria to determine whether to reschedule a task 68 as for determining whether to reattempt transmission of a task list. Failing tasks 68 that fall out of the retry process 130 may be maintained in a rejected task queue to facilitate system monitoring and follow-up on system errors.

The list buffer 86 of issuance module 64 may be configured to acknowledge receipt of the task list 84o by transmitting the acknowledgement 94 to the delivery manager 80 of scheduler module 62. In response to all the transaction lists for a given date and time being received at the issuance module 64, the issuance module 64 may process the tasks by opening the corresponding PNRs. The requested documents (e.g., tickets, EMDs, MCOs, etc.) and the matching comfort documents as indicated by the task records in the corresponding PNR may then be issued. The systems issuing these documents, such as the ticketing system 18, may be external to the task processing system 60. The number of documents per hour that may be issued by these external systems may vary in dependence on the technical capabilities of the external system in question.

To optimize the number of PNRs that can be processed per hour, the issuance module 64 may include a plurality of ticketing identifiers (TIDs) 92. The ticketing identifiers 92 may be configured to accept issuance requests generated by the issuance manager 90. The ticketing identifiers 92 may communicate with the external systems to process issuance requests as well as receive and process any error messages received from the external systems.

Figure 6:
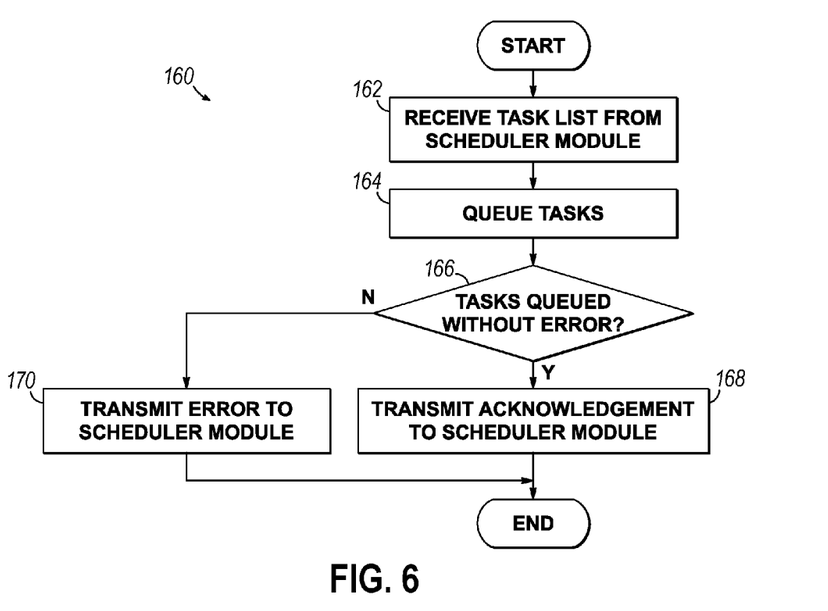
FIG. 6 is a flowchart of a queuing process that may be performed by the issuance module of FIG. 3.

Referring now to FIG. 6, a flow chart depicts a queuing process 160 which may be performed by the issuance module 64. In block 162, the task list 84o is received from the scheduler module 62. The task list 84o may be received by the list buffer 86. In block 164, the queuing process 160 may store the tasks 68 of task list 84o in a local queue before proceeding to block 166. Storing the tasks 68 in the local queue may provide an additional level of reliability by enabling the issuance module 64 to restart an issuance process from the local queue in response to a processing error. The local queue may thereby enable the issuance module 64 to avoid requesting retransmission of the task list 84o by the scheduler module 62 in response to a task processing error.

In block 166, the queuing process 160 may determine if the tasks 68 were queued without error. In response to determining all the tasks 68 of task list 84o were queued without error ("YES" branch of decision block 166), the queuing process 160 may proceed to block 168 and transmit the acknowledgement 94 to the scheduler module 62 with an indication that the tasks 68 were received. In response to determining one or more of the tasks 68 of task list 84o could not be queued ("NO" branch of decision block 166), the queuing process 160 may proceed to block 170 and transmit the acknowledgement 94 with an indication that the tasks 68 of task list 84o were not queued successfully.

Figure 7:
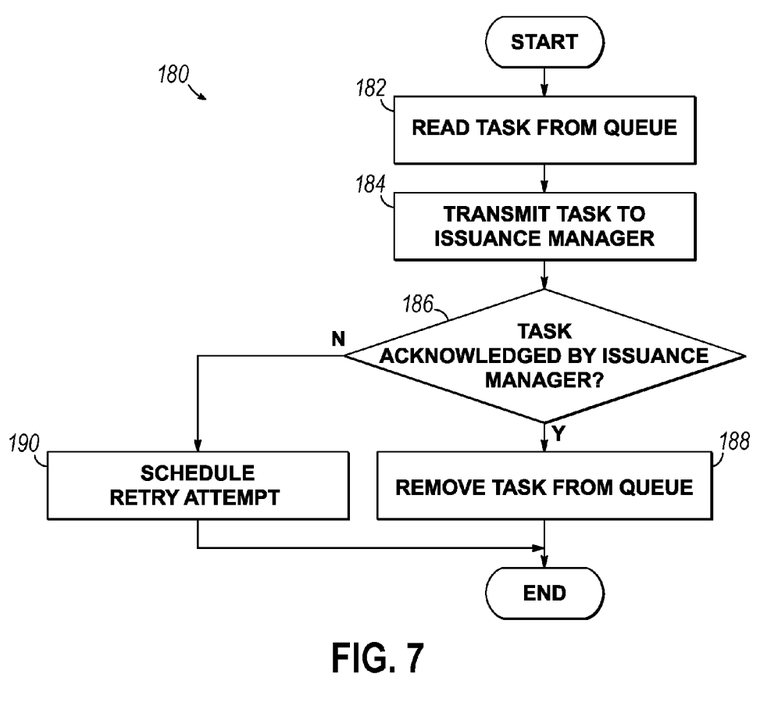
FIG. 7 is a flowchart of a queue management process that may be performed by the issuance module of FIG. 3.

Referring now to FIG. 7, a flow chart depicts a queue management process 180 which may be performed by the queuing daemon 88. In block 182, the queue management process 180 may read one of the tasks 68 of task list 84o. In block 184, the queue management process 180 may transmit the task 68 to the issuance manager 90 and proceed to block 186. In block 186, the queue management process 180 may wait for an acknowledgement from the issuance manager 90. In response to determining the issuance manager 90 acknowledged receiving the task 68 ("YES" branch of decision block 186), the queue management process 180 may proceed to block 188 and remove the task 68 from the local queue. In response to the issuance manager 90 failing to acknowledge receiving the task 68, or otherwise indicating an error in receiving the task 68 ("NO" branch of decision block 186), the queue management process 180 may proceed to block 190 and schedule a retry attempt.

The queuing daemon 88 may provide an additional level of reliability by determining if the issuance manager 90 is unavailable, and maintaining the task 68 in the local queue until the issuance manager 90 is available. Because each document issuing system may have a limited capacity to process issuance requests, the queuing daemon 88 may include a throttling feature. The throttling feature may adjust the de-queuing rate according to the load (e.g., transactions-per-second) supported by the document issuing system to which the task 68 is addressed. This rate may be varied depending on a known response time for the document issuing system in question. The issuance module 64 may thereby independently control the rate at which transactions are sent to each document issuing system.

Figure 8:
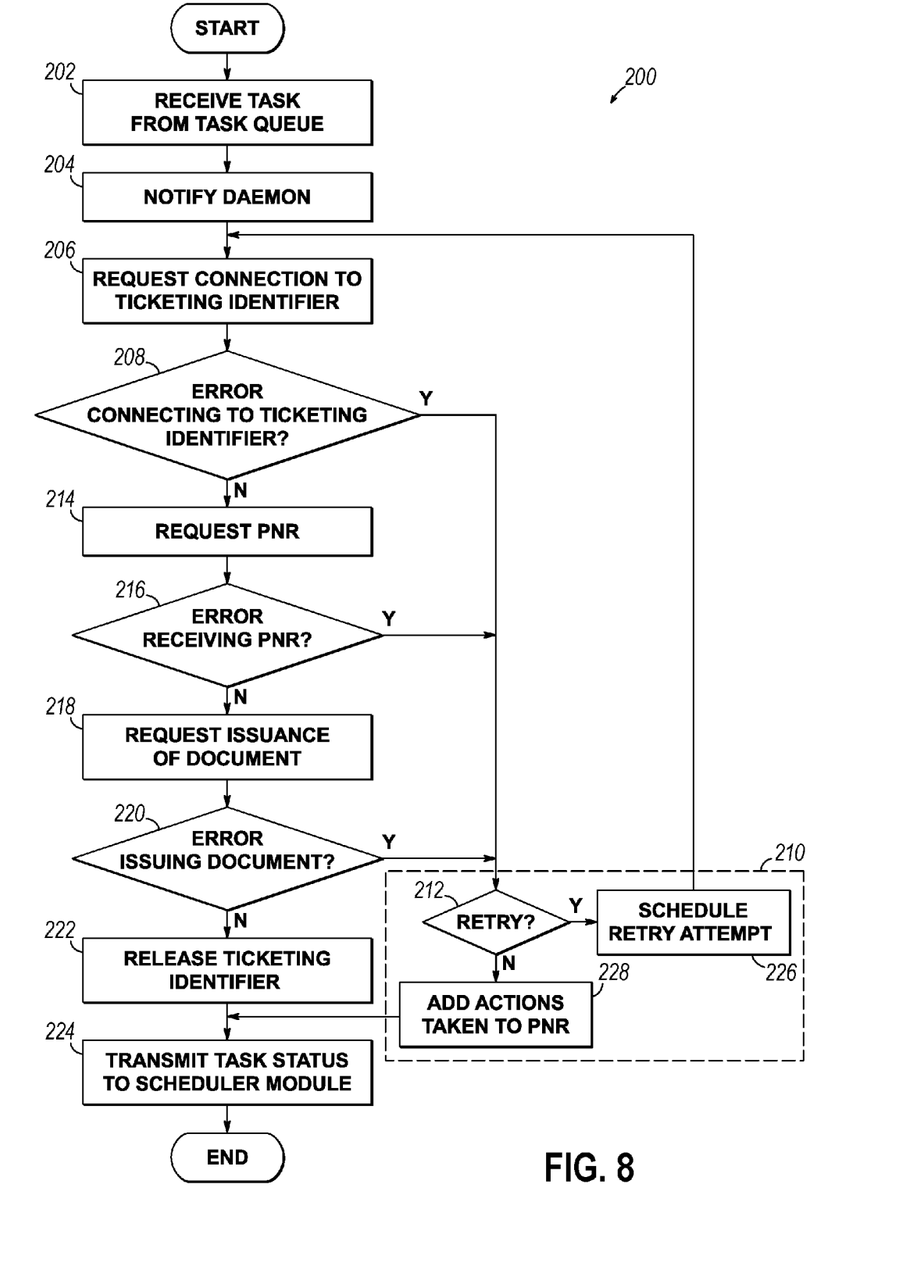
FIG. 8 is a flowchart of an issuing process that may be performed by the issuance module of FIG. 3.

Referring now to FIG. 8, a flow chart depicts an issuing process 200 which may be performed by the issuance manager 90. In block 202, the issuing process 200 may receive the task 68 from the queuing daemon 88. In response to receiving the task 68, the issuing process 200 may proceed to block 204 and notify the queuing daemon 88 that the task 68 has been received. This notification may be in the form of an acknowledgement of receipt of the task 68. The issuance process 200 may then proceed to block 206.

In block 206, the issuing process 200 may request a connection between the issuance manager 90 and one of the ticketing identifiers 92. The ticketing identifier 92 may be selected, for example, based on availability. To this end, the issuing process 200 may detect if the ticketing identifiers 92 are in use, and wait for the first available ticketing identifier 92 to process the next task. In this way, the issuing process 200 may prevent the task 68 from being lost if resources are temporarily unavailable.

The issuing process 200 may proceed to block 208 and determine if a connection has been established between the issuance manager 90 and the selected ticketing identifier 92. In response to the issuing process 200 detecting an error connecting the ticketing identifier 92 to the issuance manager 90 ("YES" branch of decision block 208), issuing process 200 may enter an error management process 210 by proceeding to block 212. In response to the issuing process 200 determining that there were no errors connecting the ticketing identifier 92 to the issuance manager 90 ("NO" branch of decision block 208), the issuing process 200 may proceed to block 214.

In block 214, the issuing process 200 may retrieve the PNR identified by the task 68 being processed. To this end, the issuing process 200 may cause the ticketing identifier 92 to transmit a request to the PNR database 74. The ticketing identifier 92 may connect with the PNR database 74 by establishing a communication link with one of the computing systems, such as the GDS 12, one of the carrier systems 14, the ticketing system 18, or any other system that provides access to the PNR database 74.

In block 216, the issuing process 200 may determine if an error occurred receiving the PNR. In response to determining that an error occurred ("YES" branch of decision block 216), the issuing process 200 may enter the error management process 210 by proceeding to block 212 as described above. In response to determining that an error did not occur ("NO" branch of decision block 216), the issuing process 200 may proceed to block 218.

In block 218, the issuing process 200 may request issuance of the document. The request may be issued by the ticketing identifier 92. To define the request, the PNR may be parsed to determine what documents must be issued to satisfy the task 68, and which systems should issue the documents. The issuing process 200 may also determine if the document to be issued has been issued previously. This determination may be based on a record in the PNR indicating that the document in question was issued. If the documents have not been issued, the ticketing identifier 92 may transmit issuance requests to the identified system. In response to receiving the issuance request, the issuing system may issue the document. The issuing system may send the issued document to the traveler by e-mail, fax, Short Message Service (SMS), Multimedia Message Service (MMS), regular mail, or any other suitable means.

In block 220, the issuing process 200 may determine if there was an error issuing the document. This determination may be based, for example, on an acknowledgment received by the ticketing identifier 92 from the issuing system. In response to determining that an error occurred issuing the document ("YES" branch of decision block 220), the issuing process 200 may enter the error management process 210 by proceeding to block 212 as described above. In response to determining that an error did not occur ("NO" branch of decision block 220), the issuing process 200 may proceed to block 222 and release the ticketing identifier 92. The issuing process 200 may then proceed to block 224 and transmit the task status message 95 to the scheduler module 62.

In block 212, the error management process 210 may determine whether the issuance manager 90 should retry processing of the task 68. This determination may be based on the types of errors that occurred, the number of previous retry attempts made, how long the retry attempts have been in process, the type of task, or any other suitable parameter. In response to the error management process 210 determining that a retry attempt should be made ("YES" branch of decision block 212), the error management process 210 may proceed to block 226. In block 226, the error management process 210 may schedule the retry attempt and proceed to block 206 to begin the retry process.

In response to determining that the retry attempt should not be made ("NO" branch of decision block 212), the error management process 210 may proceed to block 228. In block 228, the error management process 210 may add a record to the PNR documenting the actions taken by the task processing system 60, as well as any errors issuing documents. This record may enable the end user to determine which documents have yet to issue, and why, so that the end user can correct any problems. The end user may thereby determine the status of the automatic process by accessing the PNR. Depending on this status, the end user may, for example, edit the PNR to cancel issuance, change the time the document is to be issued, or change the place of issuance. The end user may also select how they are to be notified when the status of the task is updated. In any case, in response to the PNR being updated in block 228, the issuing process 200 may exit the error management process 210 and proceed to block 224. In block 224, the issuing process 200 may transmit the task status message 95 to the scheduler module 62 as described above.

In operation, the end user may modify or generate the PNR by quoting and booking a travel service, such as a flight. The end user may then add a record to the PNR indicating which documents are to be issued, the date, time, and place where the documents are to be issued, and which comfort documents to print. In response to the end user completing the transaction, the transaction may be validated. A parser application may detect the PNR activity and generate the automated ticketing task. The parser application may reside on the GDS 12, for example, or any other system having access to the PNR database 74.

The automated ticketing task may be sent to the scheduler module 62. The scheduler module 62 may then transmit the automated ticketing task to the issuance module 64 at the scheduled time. To this end, one of the scheduling daemons 82 may operate at a predefined frequency to generate the task lists 84a-84m by type and scheduled processing date. The task lists 84a-84m may then be sent to the issuance module 64 through the guaranteed transmission process. The reliability of this process may be ensured by database persistency and the queue-to-queue architecture.

The tasks 68 being processed by the scheduler module 62 may be isolated from each other at the database 78a-78n, queue, and scheduling daemons 82 level. In order to ensure the unicity of every task, a hash calculation may be used. The hash calculation may be based on a mathematical function that converts a large, possibly variable-sized amount of data into a small datum, such as an integer, that serves as an index in an array.

Documents may then be issued by external systems in response to issuance requests transmitted from the issuance module 64. The integrity of these external systems may be preserved by the issuance module 64 throttling the number of issuance requests transmitted to each external system. This throttling may regulate the number of transactions per second transmitted to a specific external system to a level known to be acceptable to that system. The throttling feature may thereby adapt the transmission rate to the external system.

If the document in question was previously issued, the issuance module 64 may determine this and mark the task as completed without taking further action. The issuance module 64 may also identify particular issuance errors and determine whether to retry immediately, retry later, or abandon the task. In case of fatal errors, the issuance module 64 may add a record indicating this condition to the PNR and transmit the PNR to the end user. The end user may thereby be notified of the need to take manual action. In response to the task being successfully processed, the issuance module 64 may send a notification to the scheduler module 62 acknowledging this result. The scheduler module 62 may then update the status of the task 68 and remove the task from the databases 78a-78n.

The program code embodying any of the embodiments of the invention described herein is capable of being individually or collectively distributed as a program product in a variety of different forms. In particular, the program code may be distributed using computer-readable media, which may include computer-readable storage media and communication media. Computer-readable storage media, which are inherently non-transitory, may include volatile and non-volatile, and removable and non-removable tangible media implemented in any method or technology for storage of information, such as computer-readable instructions, data structures, program modules, or other data. Computer-readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Communication media may embody computer-readable instructions, data structures, or other program modules. By way of example, and not limitation, communication media may include wired media such as a wired network or direct-wired connection, and wireless media such as acoustic, RF, infrared and other wireless media. Combinations of any of the above may also be included within the scope of computer-readable media.

The methods described herein can be implemented by computer program instructions supplied to the processor of any type of computer to produce a machine with a processor that executes the instructions to implement the functions/acts specified herein. These computer program instructions may also be stored in a computer-readable medium that can direct a computer to function in a particular manner. To that end, the computer program instructions may be loaded onto a computer to cause the performance of a series of operational steps and thereby produce a computer implemented process such that the executed instructions provide processes for implementing the functions/acts specified herein.

In addition, program code described herein may be identified based upon the application or software component within which the program code is implemented in a specific embodiment of the invention. However, it should be appreciated that any particular program nomenclature that follows is used merely for convenience, and thus the invention should not be limited to use solely in any specific application identified or implied by such nomenclature. It should be further appreciated that the various features, applications, and devices disclosed herein may also be used alone or in any combination. Moreover, given the typically endless number of manners in which computer programs may be organized into routines, procedures, methods, modules, objects, and the like, as well as the various manners in which program functionality may be allocated among various software layers that are resident within a typical computing system (e.g., operating systems, libraries, APIs, applications, applets, etc.), or across one or more hardware platforms, it should be appreciated that the invention is not limited to the specific organization and allocation of program functionality described herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" or "comprising," when used in this specification, specify the presence of stated features, integers, steps, operations, elements, or components, but do not preclude the presence or addition of one or more other features, integers, steps, operations, elements, components, or groups thereof. Furthermore, to the extent that the terms "includes", "having", "has", "with", "comprised of", or variants thereof are used in either the detailed description or the claims, such terms are intended to be inclusive in a manner similar to the term "comprising."

While embodiments of the invention have been illustrated by a description of various examples, and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative methods, and illustrative examples shown and described. Accordingly, departures may be made from such details without departing from the spirit or scope of applicant's general inventive concept.

What is claimed is:

1. A method of issuing documents for travel products, the method comprising:
receiving, at a computer, data defining a plurality of tasks, each task relating to issuance of a document and having a time for issuance;
queuing, by the computer, each task in a first queue;
in response to a trigger condition for a first task in the first queue being met, forwarding, by the computer, the first task from the first queue to a second queue;
in response to the first task being queued in the second queue, generating, by the computer, an issuance request;
establishing, by the computer, a link between a first ticketing identifier and a first issuing application, the first issuing application having a maximum number of transactions per unit of time that can be processed;
transmitting, by the computer, the issuance request to the first issuing application via the link, the issuance request being one of a plurality of issuance requests to be transmitted to the first issuing application;
adjusting, by the computer, a rate that the issuance requests are transmitted to the first issuing application based on the maximum number of transactions per unit of time; and
in response to the issuance request being processed by the first issuing application, releasing, by the computer, the first ticketing identifier.

2. The method of claim 1 further comprising:
queuing the first task in the second queue; and
in response to the first task being queued in the second queue, removing the first task from the first queue.

3. The method of claim 1 wherein the first task is related to a second task in the first queue, and further comprising:
grouping the first task and the second task;
queuing the second task in the second queue; and
removing the first task and the second task as a batch from the first queue in response to the first task and the second task being queued in the second queue.

4. The method of claim 3 wherein the first task and the second task are related by a common association with a passenger name record.

5. The method of claim 1 wherein the trigger condition comprises an actual time reaching the time for issuance of the first task.

6. The method of claim 1 wherein the first queue comprises a first database and a second database, and queuing each task in the first queue comprises:
determining a type of each task; and
for each task, storing the task in the first database if the task is of a first type, or in the second database if the task is of a second type.

7. The method of claim 6 further comprising:
querying the first database at a first frequency for tasks satisfying the trigger condition; and
querying the second database at a second frequency for tasks satisfying the trigger condition,
wherein the second frequency differs from the first frequency.

8. The method of claim 1 further comprising:
in response to the document being issued by the first issuing application, removing the first task from the first queue.

9. The method of claim 1 wherein:
the first ticketing identifier is selected from a plurality of ticketing identifiers including the first ticketing identifier and a second ticketing identifier; and
the first issuing application is selected by the first ticketing identifier from the first issuing application and a second issuing application based on a ticketing office designated by the task.

10. The method of claim 1 wherein the issuance request is generated based on a passenger name record associated with the first task.

11. An apparatus for issuing documents for travel products, the apparatus comprising:
a processor; and
a memory coupled to the processor and including instructions that, when executed by the processor, cause the apparatus to:
receive data defining a plurality of tasks, each task relating to issuance of a document and having a time for issuance;
queue each task in a first queue;
in response to a trigger condition for a first task in the first queue being met, forward the first task from the first queue to a second queue;
in response to the first task being queued in the second queue, generate an issuance request;
establish a link between a first ticketing identifier and a first issuing application, the first issuing application having a maximum number of transactions per unit of time that can be processed;
transmit the issuance request to the first issuing application via the link, the issuance request being one of a plurality of issuance requests to be transmitted to the first issuing application;
adjust a rate that the issuance requests are transmitted to the first issuing application based on the maximum number of transactions per unit of time; and
in response to the issuance request being processed by the first issuing application, release the first ticketing identifier.

12. The apparatus of claim 11 wherein the first task is related to a second task in the first queue, and the instructions are further configured to cause the apparatus to:
queue the first task in the second queue; and
in response to the first task being queued in the second queue, remove the first task from the first queue.

13. The apparatus of claim 11 wherein the first task is related to a second task in the first queue, and the instructions are further configured to cause the apparatus to:
group the first task and the second task;
queue the second task in the second queue; and
remove the first task and the second task as a batch from the first queue in response to the first task and the second task being queued in the second queue.

14. The apparatus of claim 13 wherein the first task and the second task are related by a common association with a passenger name record.

15. The apparatus of claim 11 wherein the trigger condition comprises an actual time reaching the time for issuance of the first task.

16. The apparatus of claim 11 wherein the first queue comprises a first database and a second database, and the instructions cause the apparatus to queue each task in the first queue by:
determining a type of each task; and
for each task, storing the task in the first database if the task is of a first type, or in the second database if the task is of a second type.

17. The apparatus of claim 16 wherein the instructions are further configured to cause the apparatus to:
query the first database at a first frequency for tasks satisfying the trigger condition; and
query the second database at a second frequency for tasks satisfying the trigger condition,
wherein the second frequency differs from the first frequency.

18. The apparatus of claim 11 wherein the instructions are further configured to cause the apparatus to:
in response to the document being issued by the first issuing application, remove the first task from the first queue.

19. The apparatus of claim 11 wherein:
the first ticketing identifier is selected from a plurality of ticketing identifiers including the first ticketing identifier and a second ticketing identifier; and
the first issuing application is selected by the first ticketing identifier from the first issuing application and a second issuing application based on a ticketing office designated by the task.

20. A computer program product comprising:
a non-transitory computer readable storage medium; and
instructions stored on the non-transitory computer readable storage medium that, when executed by a processor, cause the processor to:
receive data defining a plurality of tasks, each task relating to issuance of a document and having a time for issuance;
queue each task in a first queue;
in response to a trigger condition for a first task in the first queue being met, forward the first task from the first queue to a second queue;
in response to the first task being queued in the second queue, generate an issuance request;
establish a link between a first ticketing identifier and a first issuing application, the first issuing application having a maximum number of transactions per unit of time that can be processed;
transmit the issuance request to the first issuing application via the link, the issuance request being one of a plurality of issuance requests to be transmitted to the first issuing application;
adjust a rate that the issuance requests are transmitted to the first issuing application based on the maximum number of transactions per unit of time; and
in response to the issuance request being processed by the first issuing application, release the first ticketing identifier.

* * * * *